US011624313B2

United States Patent
Rokuta et al.

(10) Patent No.: US 11,624,313 B2
(45) Date of Patent: Apr. 11, 2023

(54) ENGINE WITH COMBUSTION CHAMBER

(71) Applicant: Mazda Motor Corporation, Hiroshima (JP)

(72) Inventors: Kazuya Rokuta, Aki-gun (JP); Tomomi Watanabe, Aki-gun (JP); Yusuke Oda, Aki-gun (JP); Yoshitaka Wada, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/453,827

(22) Filed: Nov. 5, 2021

(65) Prior Publication Data
US 2022/0162982 A1    May 26, 2022

(30) Foreign Application Priority Data

Nov. 25, 2020  (JP) .............................. JP2020-195040

(51) Int. Cl.
*F02B 23/10*    (2006.01)
*F02F 1/24*    (2006.01)
(Continued)

(52) U.S. Cl.
CPC ............ *F02B 23/104* (2013.01); *F02F 1/242* (2013.01); *F02F 3/24* (2013.01); *F02F 3/26* (2013.01); *F02F 2001/241* (2013.01)

(58) Field of Classification Search
CPC .. F02B 23/104; F02B 23/10; F02B 2023/106; F02F 1/242; F02F 3/24; F02F 2001/241; F16J 1/09; Y02T 10/12
See application file for complete search history.

(56) References Cited

U.S. PATENT DOCUMENTS

| 4,046,116 A | * | 9/1977 | Burnham | ................ F02B 75/04 |
| | | | | 123/193.5 |
| 4,060,059 A | * | 11/1977 | Blaser | ..................... F02B 33/26 |
| | | | | 123/26 |

(Continued)

FOREIGN PATENT DOCUMENTS

| EP | 1069291 A2 | 1/2001 |
| EP | 1069291 A3 | 5/2001 |

(Continued)

OTHER PUBLICATIONS

European Patent Office, Extended European Search Report Issued in Application No. 21205453.0, dated May 3, 2022, Germany, 7 pages.

*Primary Examiner* — Grant Moubry
*Assistant Examiner* — James G Moubry
(74) *Attorney, Agent, or Firm* — Alleman Hall Creasman & Tuttle LLP

(57) ABSTRACT

An engine is provided, which includes a combustion chamber defined by a crown surface of a piston, an inner wall surface of a cylinder in which the piston is slidably accommodated, and a pentroof-type ceiling surface formed in a cylinder head and formed with an intake port and an exhaust port. The crown surface includes an exhaust-side bottom part, an intake-side bottom part, an exhaust-side sloped surface rising toward a center part of the crown surface from the exhaust-side bottom part, an intake-side sloped surface rising toward the center part from the intake-side bottom part, and a flat surface provided continuously between upper ends of the exhaust-side and intake-side sloped surfaces, and extending perpendicularly to a cylinder axial direction in the center part of the crown surface. A surface area of the flat surface is larger than a surface area of the exhaust-side sloped surface.

18 Claims, 14 Drawing Sheets

(51) Int. Cl.
*F02F 3/24* (2006.01)
*F02F 3/26* (2006.01)

(56) References Cited

U.S. PATENT DOCUMENTS

| | | | | |
|---|---|---|---|---|
| 4,184,462 A | * | 1/1980 | Hale | F02B 75/007 |
| | | | | 123/54.6 |
| 5,392,744 A | * | 2/1995 | Regueiro | F02B 19/18 |
| | | | | 123/262 |
| 2009/0319156 A1 | * | 12/2009 | Fujikawa | F02B 23/104 |
| | | | | 123/308 |
| 2020/0018225 A1 | * | 1/2020 | Aoki | F02B 23/10 |

FOREIGN PATENT DOCUMENTS

| | | | | | |
|---|---|---|---|---|---|
| EP | 3584420 A1 | 12/2019 | | | |
| JP | 2001073777 A | 3/2001 | | | |
| JP | 2018162733 A | 10/2018 | | | |
| JP | 6515941 B2 | 5/2019 | | | |
| WO | 2015162796 A1 | 10/2015 | | | |
| WO | WO-2015162796 A1 | * | 10/2015 | | F02B 23/08 |
| WO | WO-2018180133 A1 | * | 10/2018 | | F02B 23/08 |

* cited by examiner

FIG. 11

| | EXAMPLE 1 | EXAMPLE 2 |
|---|---|---|
| <OUTLINE VIEW> POSITION OF FLAT SURFACE | SURFACE AREA OF FLAT SURFACE = 919.0mm² | SURFACE AREA OF FLAT SURFACE = 1556.0mm² |
| <TOP VIEW> POSITION OF INTAKE-SIDE SLOPED SURFACE | SURFACE AREA OF INTAKE-SIDE SLOPED SURFACE = 955.6mm² | SURFACE AREA OF INTAKE-SIDE SLOPED SURFACE = 927.5mm² |
| <TOP VIEW> POSITION OF EXHAUST-SIDE SLOPED SURFACE | (a) 531  (b) 532<br>TOTAL SURFACE AREA OF EXHAUST-SIDE SLOPED SURFACE = 875.0mm²<br>・(a) RECESS PART = 657.5mm²<br>・(b) INTER-RECESS = 217.5mm² | (a) 531  (b) 532<br>TOTAL SURFACE AREA OF EXHAUST-SIDE SLOPED SURFACE = 858.5mm²<br>・(a) RECESS PART = 660.7mm²<br>・(b) INTER-RECESS = 197.8mm² |
| TOTAL OF SLOPED SURFACE AREAS | IN;955.6mm² + OUT;875.0mm² = 1830.6mm² | IN;927.5mm² + OUT;858.5mm² = 1786.0mm² |
| TURBULENT FLOW E RATIO (EX./COMP.) | 1.12 | 1.37 |
| COMPRESSION RATIO | 15 | 15 |

FIG. 12

| | EXAMPLE 3 | EXAMPLE 4 |
|---|---|---|
| <OUTLINE VIEW> POSITION OF FLAT SURFACE | SURFACE AREA OF FLAT SURFACE = 1988.9mm$^2$ | SURFACE AREA OF FLAT SURFACE = 1932.2mm$^2$ |
| <TOP VIEW> POSITION OF INTAKE-SIDE SLOPED SURFACE | SURFACE AREA OF INTAKE-SIDE SLOPED SURFACE = 763.9mm$^2$ | SURFACE AREA OF INTAKE-SIDE SLOPED SURFACE = 729.7mm$^2$ |
| <TOP VIEW> POSITION OF EXHAUST-SIDE SLOPED SURFACE | TOTAL SURFACE AREA OF EXHAUST-SIDE SLOPED SURFACE = 740.7mm$^2$<br>·(a) RECESS PART = 528.0mm$^2$<br>·(b) INTER-RECESS = 75.5mm$^2$<br>·(c) RECESS LOWER = 137.2mm$^2$ | TOTAL SURFACE AREA OF EXHAUST-SIDE SLOPED SURFACE = 667.4mm$^2$<br>·(a) RECESS PART = 472.6mm$^2$<br>·(b) INTER-RECESS = 194.8mm$^2$ |
| TOTAL OF SLOPED SURFACE AREAS | IN;763.9mm$^2$+OUT;740.7mm$^2$ = 1504.6mm$^2$ | IN;729.7mm$^2$+OUT;667.4mm$^2$ = 1397.1mm$^2$ |
| TURBULENT FLOW E RATIO (EX./COMP.) | 1.56 | 1.78 |
| COMPRESSION RATIO | 15 | 14 |

FIG. 13

| | EXAMPLE 5 | EXAMPLE 6 |
|---|---|---|
| <OUTLINE VIEW> POSITION OF FLAT SURFACE | SURFACE AREA OF FLAT SURFACE = 2299.8mm² | SURFACE AREA OF FLAT SURFACE = 2612.4mm² |
| <TOP VIEW> POSITION OF INTAKE-SIDE SLOPED SURFACE | SURFACE AREA OF INTAKE-SIDE SLOPED SURFACE = 608.1mm² | SURFACE AREA OF INTAKE-SIDE SLOPED SURFACE = 865.8mm² |
| <TOP VIEW> POSITION OF EXHAUST-SIDE SLOPED SURFACE | TOTAL SURFACE AREA OF EXHAUST-SIDE SLOPED SURFACE = 588.0mm²<br>•(a) RECESS PART = 392.7mm²<br>•(b) INTER-RECESS = 58.6mm²<br>•(c) RECESS LOWER = 136.7mm² | TOTAL SURFACE AREA OF EXHAUST-SIDE SLOPED SURFACE = 853.2mm²<br>•(a) RECESS PART = 591.6mm²<br>•(b) INTER-RECESS = 59.2mm²<br>•(c) RECESS LOWER = 202.4mm² |
| TOTAL OF SLOPED SURFACE AREAS | IN:608.1mm² + OUT:588.0mm² = 1196.1mm² | IN:865.8mm² + OUT:853.2mm² = 1719.0mm² |
| TURBULENT FLOW E RATIO (EX./COMP.) | 1.92 | 2.42 |
| COMPRESSION RATIO | 14 | 14 |

FIG. 14

| | EXAMPLE 7 | COMPARATIVE EXAMPLE |
|---|---|---|
| <OUTLINE VIEW> POSITION OF FLAT SURFACE | 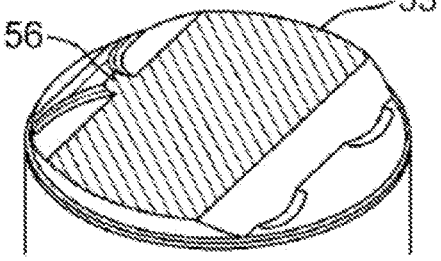<br>SURFACE AREA OF FLAT SURFACE = 3484.7mm² | 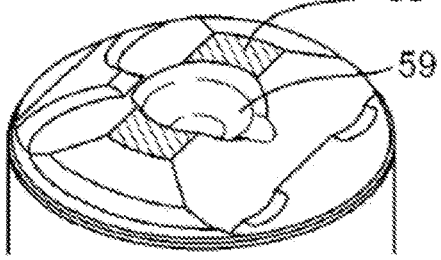<br>SURFACE AREA OF FLAT SURFACE = 287.3mm² |
| <TOP VIEW> POSITION OF INTAKE-SIDE SLOPED SURFACE | 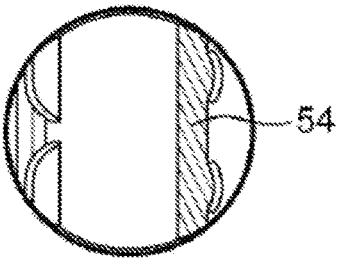<br>SURFACE AREA OF INTAKE-SIDE SLOPED SURFACE = 865.1mm² | 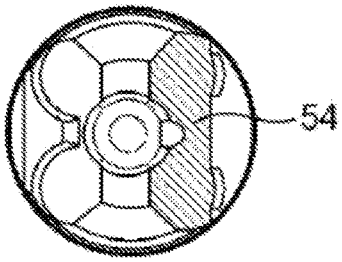<br>SURFACE AREA OF INTAKE-SIDE SLOPED SURFACE = 924.6mm² |
| <TOP VIEW> POSITION OF EXHAUST-SIDE SLOPED SURFACE | 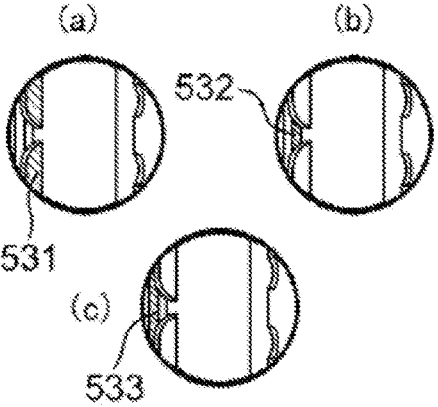<br>TOTAL SURFACE AREA OF EXHAUST-SIDE SLOPED SURFACE = 709.3mm²<br>·(a) RECESS PART = 462.0mm²<br>·(b) INTER-RECESS = 71.5mm²<br>·(c) RECESS LOWER = 175.8mm² | 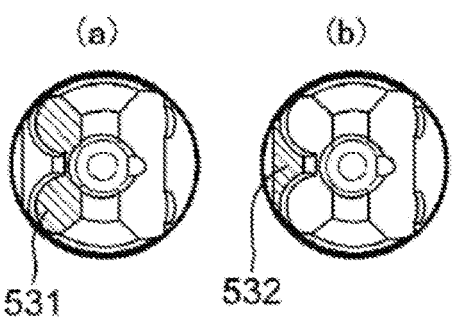<br>TOTAL SURFACE AREA OF EXHAUST-SIDE SLOPED SURFACE = 907.2mm²<br>·(a) RECESS PART = 689.7mm²<br>·(b) INTER-RECESS = 217.5mm² |
| TOTAL OF SLOPED SURFACE AREAS | IN: 865.1mm² + OUT: 709.3mm² = 1574.4mm² | IN: 924.6mm² + OUT: 907.2mm² = 1831.8mm² |
| TURBULENT FLOW E RATIO (EX./COMP.) | 3.24 | 1 |
| COMPRESSION RATIO | 13.5 | 14 |

ENGINE WITH COMBUSTION CHAMBER

TECHNICAL FIELD

The present disclosure relates to a combustion chamber structure for an engine provided with a combustion chamber having a pentroof-type ceiling surface.

BACKGROUND OF THE DISCLOSURE

For the purposes of improvement in thermal efficiency and improvement in fuel efficiency, a daily study has been done on the structure of a combustion chamber for an engine (especially, the structure of a piston). For example, JP2018-162733A discloses a combustion chamber provided with a pentroof-type ceiling surface, in which a cavity is formed in a piston crown surface, and a sloped surface is formed along the shape of the ceiling surface. According to the combustion chamber structure, a slowdown of a tumble flow is suppressed to stimulate combustion, and therefore, the fuel efficiency improves.

An effective measure for simply improving the fuel efficiency is setting the compression ratio higher. However, if the compression ratio is high, the pressure and the temperature inside the combustion chamber increase excessively at a compression end, for example, in a low-speed high-load operating range, which induces abnormal combustion. This abnormal combustion is due to a rapid self-ignition of unburnt fuel gas before the completion of flame propagation combustion, and, thereby, knocking occurs.

Conventionally, the measure to intentionally suppress the engine output is taken for a prevention of the occurrence of knocking described above. In detail, by devising the injection timing of fuel into the combustion chamber and the ignition timing of an air-fuel mixture to retard the combustion center of gravity, the engine output is suppressed. Since such a measure impedes the high output of the engine, it should be avoided as much as possible. Although the combustion chamber structure disclosed in JP2018-162733A could also contribute to the improvement in fuel efficiency, according to further research by the present inventors, it is found to be insufficient from the viewpoint of maintaining the tumble flow until the second half of a compression stroke.

SUMMARY OF THE DISCLOSURE

One purpose of the present disclosure is to provide a combustion chamber structure for an engine, which is capable of improving engine output, while suppressing knocking.

According to one aspect of the present disclosure, an engine comprising a combustion chamber is provided, the combustion chamber being defined by a crown surface of a piston, an inner wall surface of a cylinder in which the piston is slidably accommodated, and a pentroof ceiling surface formed in a cylinder head. An opening of an intake port configured to supply intake air to the combustion chamber and an opening of an exhaust port configured to discharge exhaust gas from the combustion chamber are formed in the ceiling surface, a side on which the intake port is disposed is an intake side, and a side on which the exhaust port is disposed is an exhaust side. The crown surface includes an exhaust-side bottom part disposed near an exhaust-side edge of the crown surface, and an intake-side bottom part disposed near an intake-side edge of the crown surface, an exhaust-side sloped surface rising toward a center part of the crown surface from the exhaust-side bottom part, an intake-side sloped surface rising toward the center part of the crown surface from the intake-side bottom part, and a flat surface provided continuously between an upper end of the exhaust-side sloped surface and an upper end of the intake-side sloped surface, and extending in a direction perpendicular to an axial direction of the cylinder in the center part of the crown surface. A surface area of the flat surface is larger than a surface area of the exhaust-side sloped surface.

According to this structure, since the intake port is formed in the pentroof ceiling surface, a tumble flow is formed inside the combustion chamber. The crown surface of the piston is bulged in a convex shape by the exhaust-side sloped surface and the intake-side sloped surface to have the continuous flat surface in the center part. Note that "the continuous flat surface" means a flat surface where no dent, such as a cavity, exists.

By forming the continuous flat surface, the tumble flow can flow along the flat surface, without being impeded by a dent, such as a cavity. Further, since the surface area of the flat surface is set larger than the surface area of the exhaust-side sloped surface, the tumble flow colliding with the exhaust-side sloped surface and becoming weaker can be suppressed. With these structures, the resistance of the crown surface of the piston to the tumble flow is reduced and the tumble flow can be maintained until the second half of a compression stroke. Turbulent energy is generated when the tumble flow collapses. Maintaining the tumble flow leads to that the turbulent energy which is originally held by the tumble flow is maintained at a high state. Therefore, by collapsing the tumble flow in the second half of a compression stroke to generate the high turbulent energy, it becomes possible to speed up the combustion speed. Therefore, the combustion of the air-fuel mixture can be completed before the occurrence of a self-ignition which results in a knock. In addition, since knocking can be suppressed, the control for suppressing the engine output, such as retarding the combustion center of gravity, can be avoided. As the result, the high compression ratio can be achieved.

The surface area of the flat surface may be larger than a surface area of the intake-side sloped surface.

If the surface area of the intake-side sloped surface is too large, the tumble flow along the intake-side sloped surface becomes more easily formed. In this case, the tumble flow collides with the inner wall surface of the cylinder to impede the maintainability of the tumble flow. According to this structure, since the surface area of the flat surface is set larger than the surface area of the intake-side sloped surface, the tumble flow can flow along the flat surface while the tumble flow along the intake-side sloped surface is prevented from being generated. Therefore, it becomes easier to maintain the tumble flow until the second half of a compression stroke.

The surface area of the flat surface may be larger than a total of the surface area of the exhaust-side sloped surface and the surface area of the intake-side sloped surface.

According to this structure, the collision of the tumble flow to the exhaust-side sloped surface, and the collision of the tumble flow to the inner wall surface of the cylinder by being guided by the intake-side sloped surface can be further suppressed. Therefore, the maintainability of the tumble flow can be further improved.

A spark plug configured to achieve flame propagation combustion inside the combustion chamber may be disposed in the ceiling surface opposing the flat surface.

Intake air compressed without the tumble flow being weakened, becomes high in the turbulent energy at the position opposing to the flat surface. By disposing the spark plug at such a position, the combustion speed of the flame propagation combustion can be sped up.

An injector configured to inject fuel into the combustion chamber may be disposed on the intake side of the combustion chamber.

According to this structure, it becomes easier to put the fuel sprayed from the injector on the tumble flow so that a homogeneous air-fuel mixture is formed inside the combustion chamber.

A geometric compression ratio of the cylinder may be set within a range of 13.5:1 or higher and 15.5:1 or lower. According to this, the fuel efficiency can be improved.

The flat surface may include an inter-recess flat surface disposed between a pair of recess parts of the exhaust-side sloped surface, and that continues to a main portion of the flat surface.

No cavity may be formed in the flat surface.

BRIEF DESCRIPTION OF DRAWINGS

FIG. 11 is a table illustrating structures and parameters of the piston crown surface according to Examples 1 and 2 of the present disclosure.

FIG. 12 is a table illustrating structures and parameters of the piston crown surface according to Examples 3 and 4 of the present disclosure.

FIG. 13 is a table illustrating structures and parameters of the piston crown surface according to Examples 5 and 6 of the present disclosure.

FIG. 14 is a table illustrating structures and parameters of the piston crown surface according to Example 7 of the present disclosure and Comparative Example.

DETAILED DESCRIPTION OF THE DISCLOSURE

[Entire Configuration of Engine]

Figure 1:
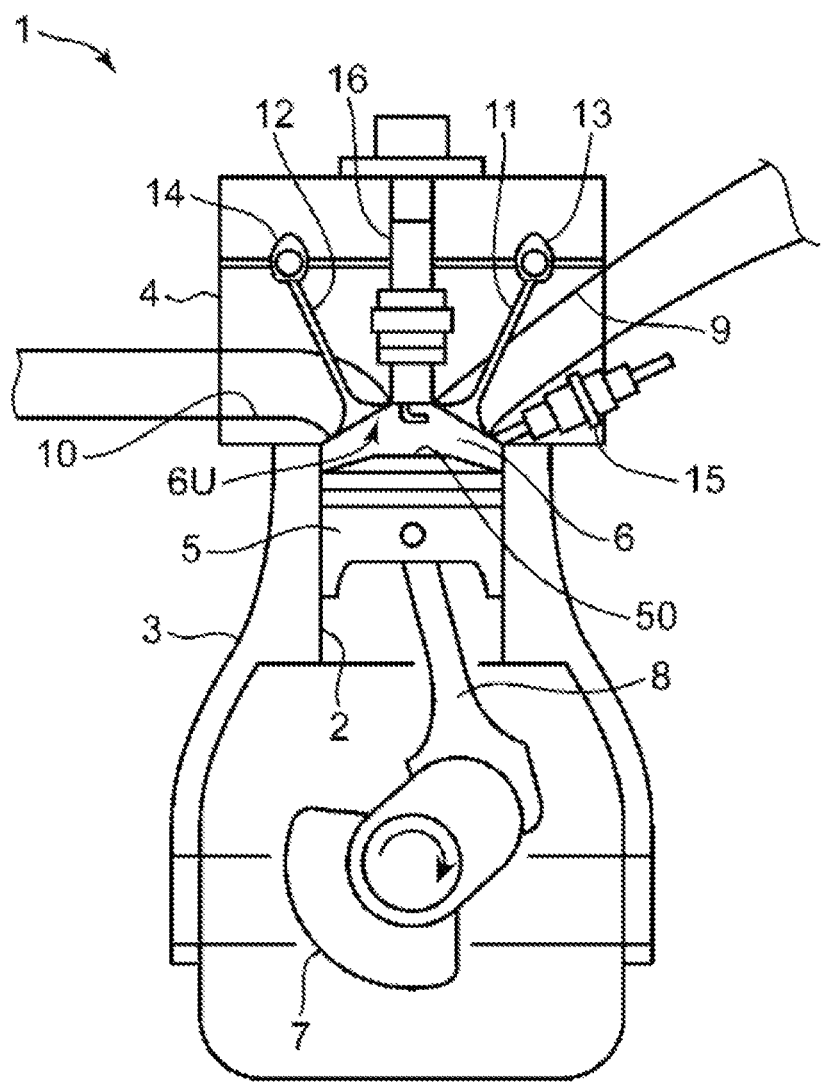
FIG. 1 is a cross-sectional view schematically illustrating an engine to which a combustion chamber structure for an engine according to the present disclosure is applied.

Hereinafter, a structure of a combustion chamber for an engine according to one embodiment of the present disclosure is described in detail with reference to the accompanying drawings. FIG. 1 is a cross-sectional view schematically illustrating an engine to which a combustion chamber structure according to one embodiment of the present disclosure is applied. The engine illustrated herein is a multi-cylinder gasoline engine mounted on a vehicle (e.g., an automobile), as a power source for propelling the vehicle. The engine is comprised of an engine body 1 and auxiliary machines, such as intake and exhaust manifolds, and various pumps (outside the drawing), which are attached to the engine body 1.

The engine body 1 includes a cylinder block 3 where a cylinder 2 is formed therein, a cylinder head 4 attached to an upper surface of the cylinder block 3 so that the cylinder 2 is closed from above, and a piston 5 accommodated in the cylinder 2. Although the engine body 1 is typically a multi-cylinder type having a plurality of (for example, four) cylinders, only one cylinder 2 is illustrated in FIG. 1 for simplification.

Figure 2:
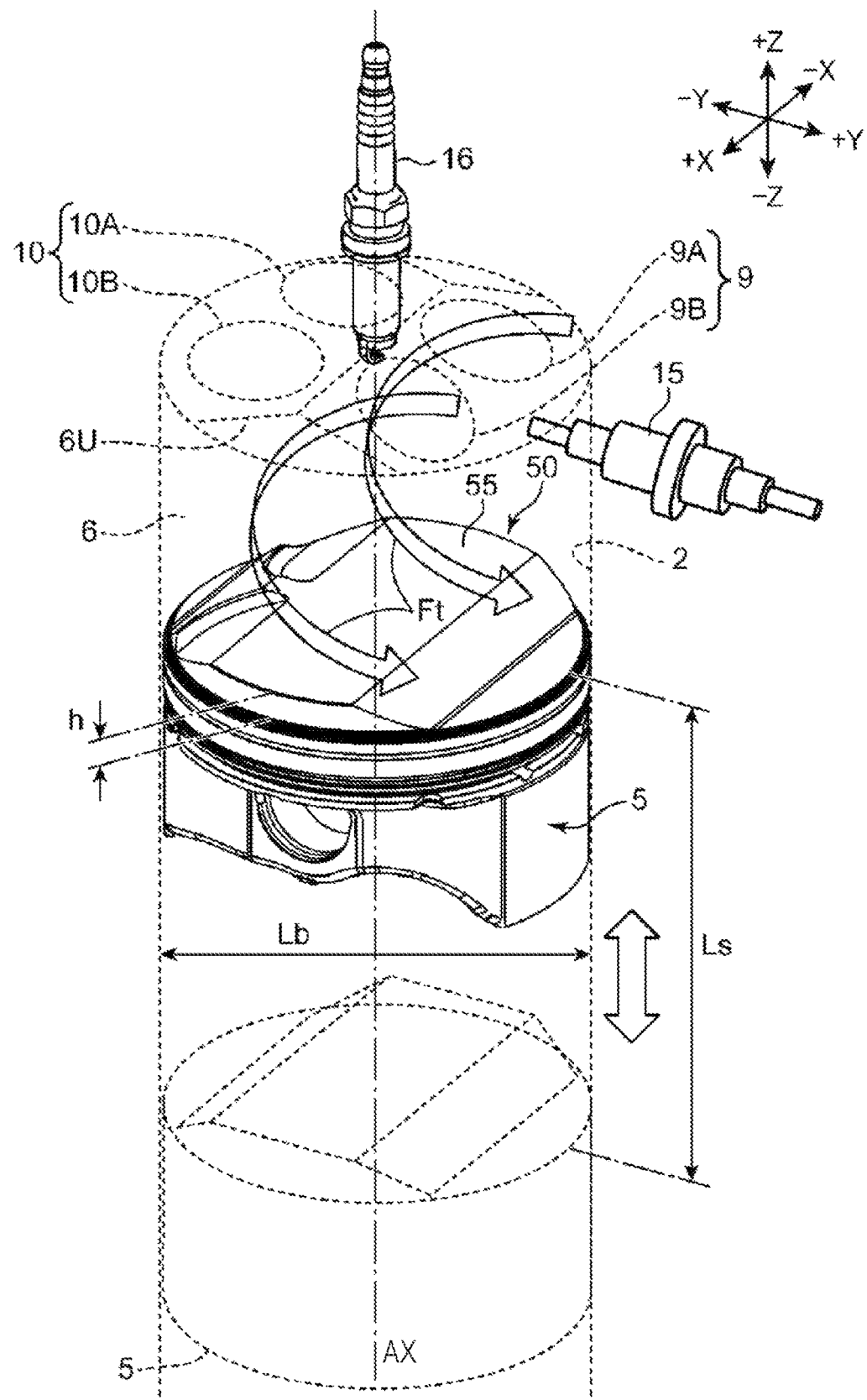
FIG. 2 is a perspective view schematically illustrating a structure of one cylinder provided to the engine.

FIG. 2 illustrates a schematic perspective view of the one cylinder 2. The piston 5 is a substantially cylindrical body having an outer diameter corresponding to a diameter Lb of the bore of the cylinder 2, and is accommodated in the cylinder 2 so as to be reciprocatingly slidable by a given stroke Ls. Although described later in detail, a crown surface 50 which is an upper surface of the piston 5 is bulged in a convex to have a flat surface 55 at a height h. Below the piston 5, a crankshaft 7 which is an output shaft of the engine body 1 is provided. The crankshaft 7 is coupled to the piston 5 via a connecting rod 8, and is rotated on a center axis according to the reciprocating movement of the piston 5.

A combustion chamber 6 is defined above the piston 5. Fuel is supplied to the combustion chamber 6 by an injection from an injector 15 (described later). The supplied fuel combusts while being mixed with air inside the combustion chamber 6, and the piston 5 which is depressed by an expansive force of the combustion reciprocates in an up-and-down direction. The combustion chamber 6 is defined by an inner wall surface of the cylinder 2, the crown surface 50 of the piston 5, and a combustion chamber ceiling surface 6U formed at the bottom surface of the cylinder head 4 (including valve surfaces of an intake valve 11 and an exhaust valve 12). The combustion chamber ceiling surface 6U is a ceiling surface having an upwardly-convex pentroof shape.

A geometric compression ratio of the cylinder 2 (i.e., a ratio of the volume of the combustion chamber 6 when the piston 5 is located at a top dead center to the volume of the combustion chamber 6 when the piston 5 is located at a bottom dead center) is desirably set as a high compression ratio (13.5:1 or higher). A desirable compression ratio range is 13.5:1 or higher and 15.5:1 or lower. By setting as such a high compression ratio, fuel efficiency can be improved.

Intake ports 9 and exhaust ports 10 which open toward the combustion chamber 6 are formed in the pentroof combustion chamber ceiling surface 6U. Each intake port 9 is a port for supplying intake air to the combustion chamber 6. The intake ports 9 of this embodiment are a tumble port which can form a tumble flow (longitudinal vortex). Flow directions of the tumble flows Ft are denoted in FIG. 2. Each exhaust port 10 is a port for discharging exhaust gas after combustion from the combustion chamber 6. The intake valve 11 which opens and closes the intake port 9, and the exhaust valve 12 which opens and closes the exhaust port 10 are provided to the combustion chamber ceiling surface 6U.

Figure 3:
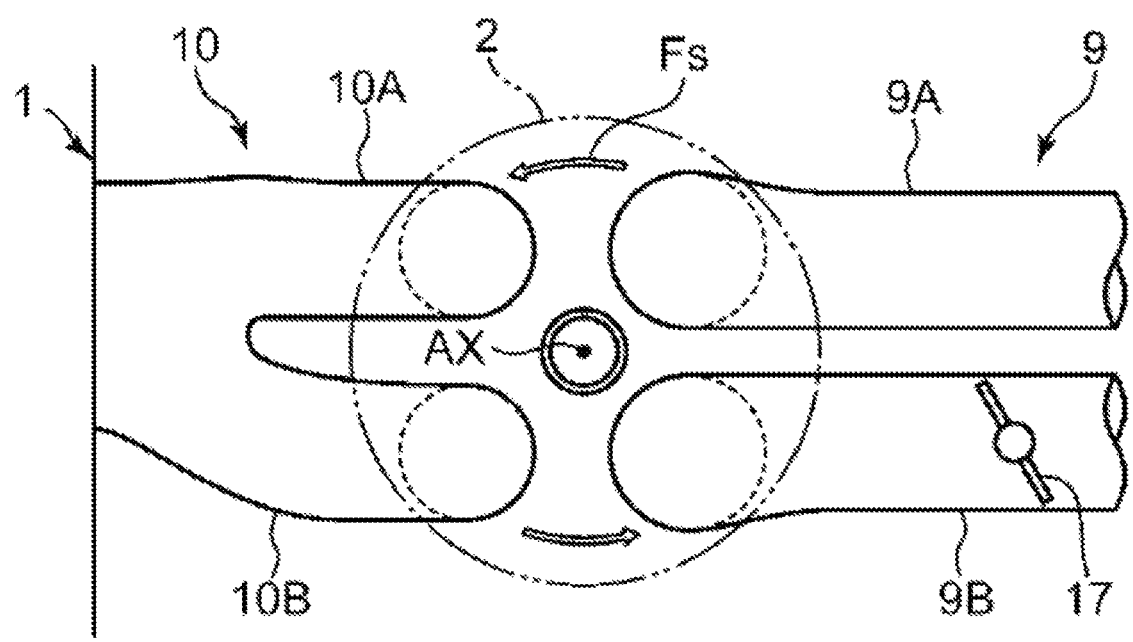
FIG. 3 is a plan view schematically illustrating a structure of a cylinder and an intake and exhaust system near the cylinder.

The valve type of the engine of this embodiment is four-valve type comprised of the two intake valves and the two exhaust valves, as illustrated in FIGS. 2 and 3. FIG. 3 is a plan view schematically illustrating structures of the cylinder 2 and an intake and exhaust system near the cylinder 2. The intake ports 9 are comprised of a first intake port 9A and a second intake port 9B. The exhaust ports 10 are comprised of a first exhaust port 10A and a second exhaust port 10B. The intake valves 11 are provided to the first intake port 9A and the second intake port 9B, respectively, and the exhaust valves 12 are provided to the first exhaust port 10A and the second exhaust port 10B, respectively.

As illustrated in FIG. 3, among the first and second intake ports 9A and 9B, a swirl valve 17 which can open and close the second intake port 9B is provided to the second intake port 9B. When the swirl valve 17 is driven in a closing direction, a rate of intake air flowing into the combustion chamber 6 from the first intake port 9A where the swirl valve 17 is not provided increases. Thus, a circling stream which circles on a cylinder axis AX (the center axis of the combustion chamber 6), i.e., a swirl flow, can be strengthened. A flow direction of a swirl flow Fs is denoted in FIG. 3. On the contrary, when the swirl valve 17 is driven in an opening direction, the swirl flow Fs can be weakened. As described above, since the intake port 9 is the tumble port, the swirl flow Fs which is formed when closing the swirl valve 17 becomes an oblique swirl flow where the swirl flow Fs is mixed with the tumble flow Ft.

An intake-side valve operating mechanism 13 which drives the intake valves 11, and an exhaust-side valve operating mechanism 14 which drives the exhaust valves 12 are disposed in the cylinder head 4. By the valve operating mechanisms 13 and 14, the intake valves 11 and the exhaust valves 12 are driven so as to be interlocked with rotation of the crankshaft 7. By this drive, valve heads of the intake valve 11 open and close openings of the intake ports 9, and valve heads of the exhaust valves 12 open and close openings of the exhaust ports 10. A variable valve timing mechanism (not illustrated) which changes opening and closing timings of the valves are incorporated in each of the valve operating mechanisms 13 and 14.

The injector 15 and a spark plug 16 are attached to the cylinder head 4. The injector 15 injects fuel supplied from a fuel system (not illustrated) to the combustion chamber 6. The injector 15 is disposed at a circumferential edge of the combustion chamber ceiling surface 6U, on the intake side where the intake ports 9 are disposed. According to such a layout, fuel sprayed from the injector 15 joins the tumble flow Ft, and becomes easier to spread inside throughout the combustion chamber 6 by riding on the tumble flow Ft. That is, a homogeneous air-fuel mixture can be formed inside the combustion chamber 6.

The spark plug 16 ignites the air-fuel mixture where fuel injected into the combustion chamber 6 from the injector 15 is mixed with air introduced into the combustion chamber 6 through the intake ports 9 (9A and 9B). The spark plug 16 is attached to the cylinder head 4 so as to be along the cylinder axis AX. An ignition electrode part of the spark plug 16 is exposed to the inside of the combustion chamber 6, at the radial center of the combustion chamber ceiling surface 6U, and opposes the flat surface 55 of the crown surface 50 of the piston 5. When ignition energy is supplied to the air-fuel mixture inside the combustion chamber 6 from the spark plug 16, flame propagation combustion occurs inside the combustion chamber 6, starting from the ignited point.

[Detailed Structure of Piston]

Figure 4:
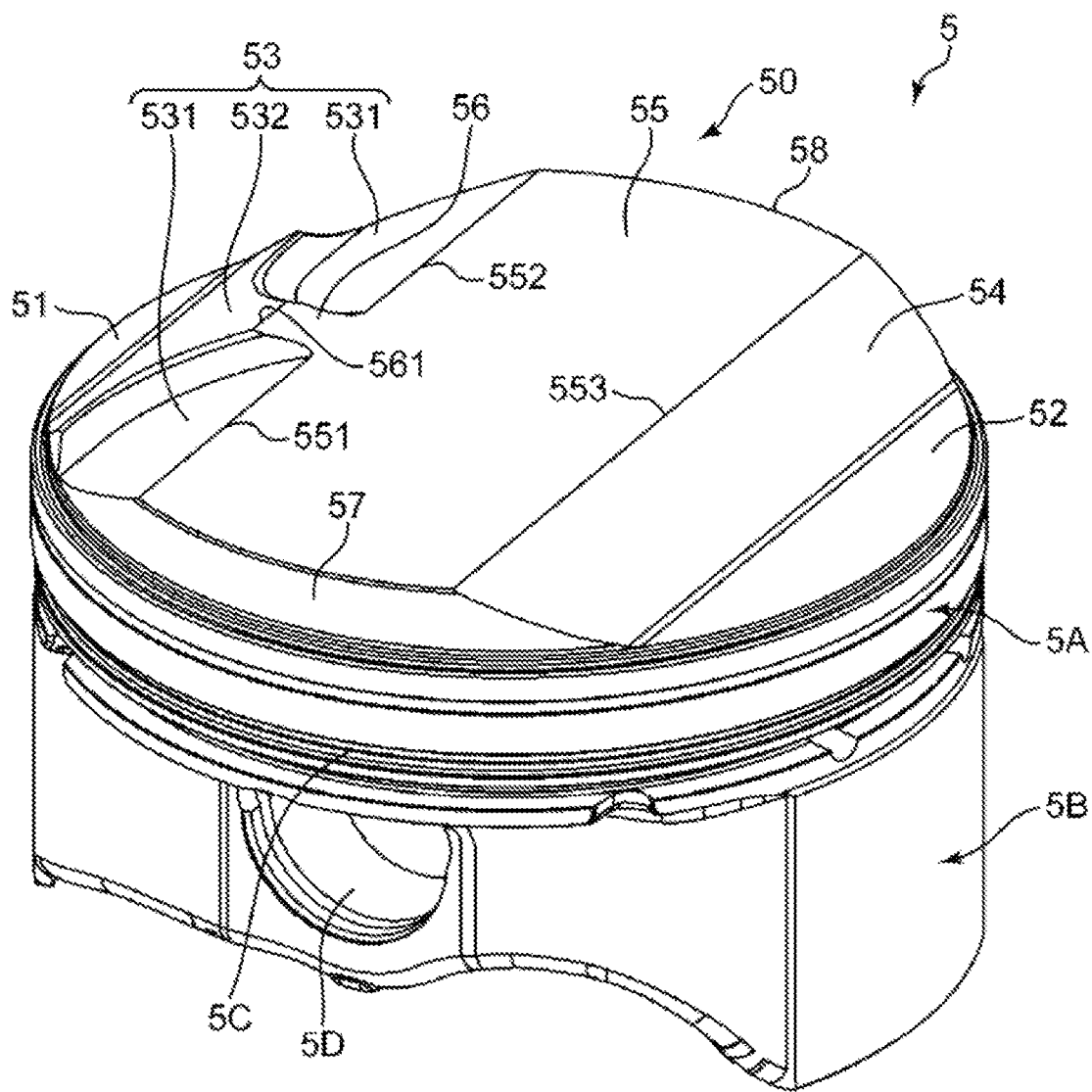
FIG. 4 is a perspective view of the piston.
Figure 5:
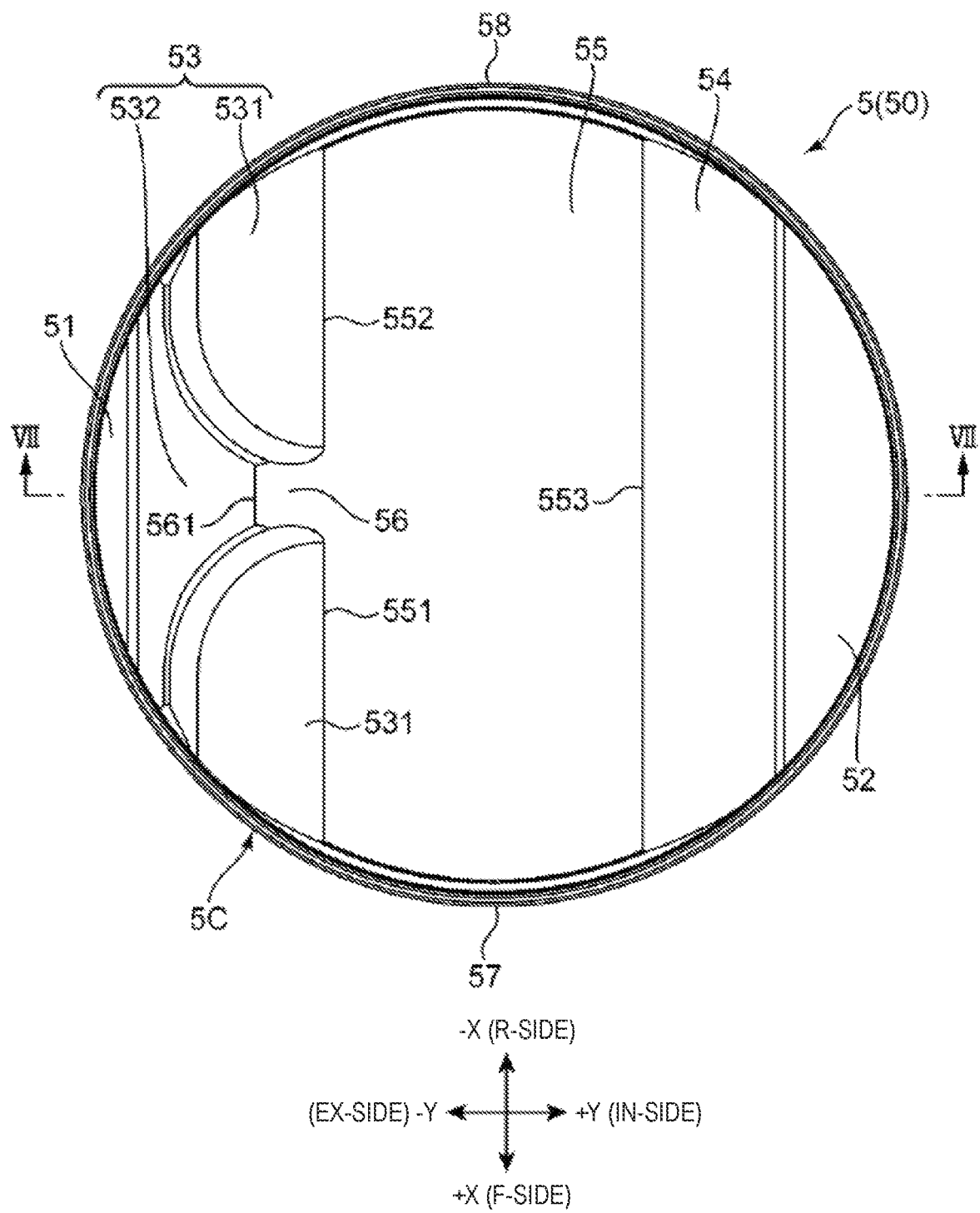
FIG. 5 is a plan view of a crown surface of the piston.
Figure 6:
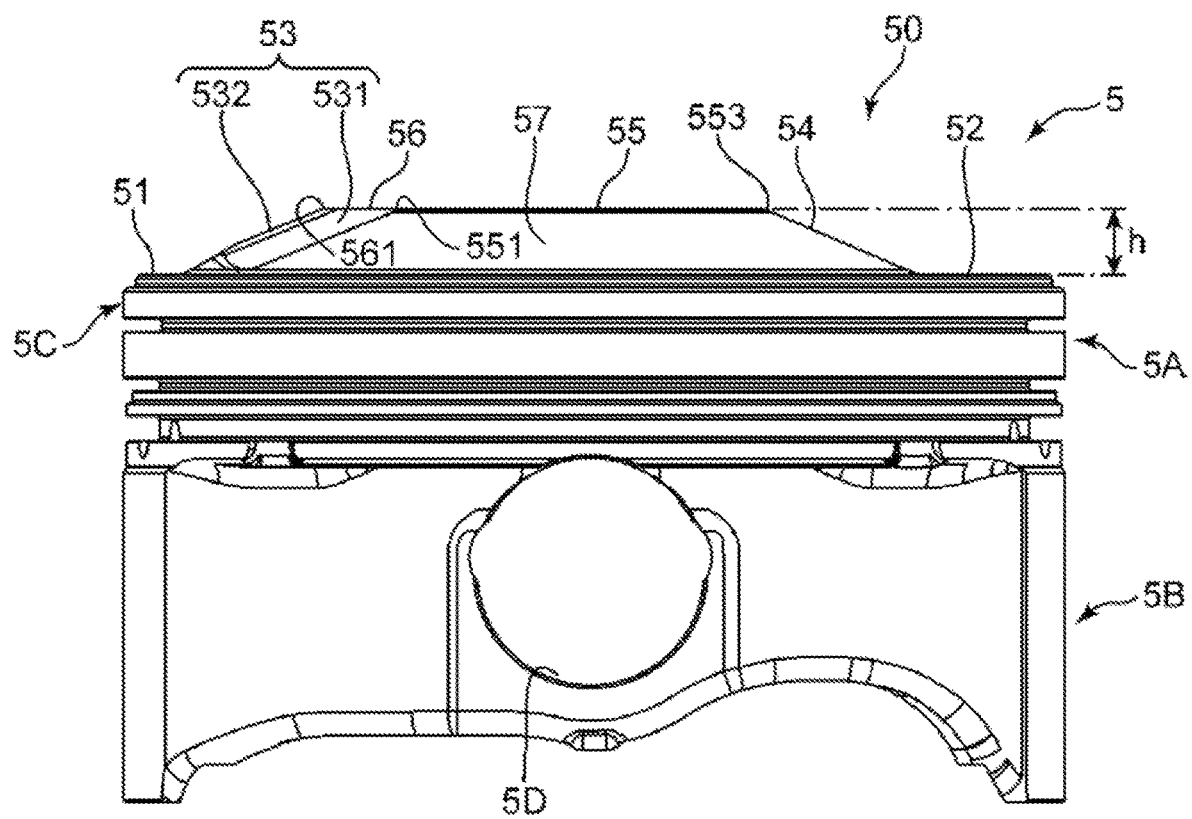
FIG. 6 is a side view of the crown surface of the piston.
Figure 6:
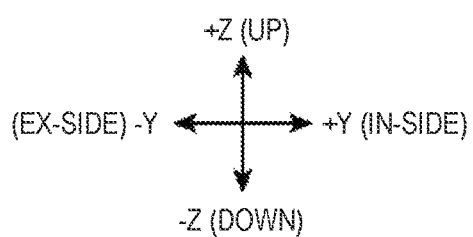
Figure 7:
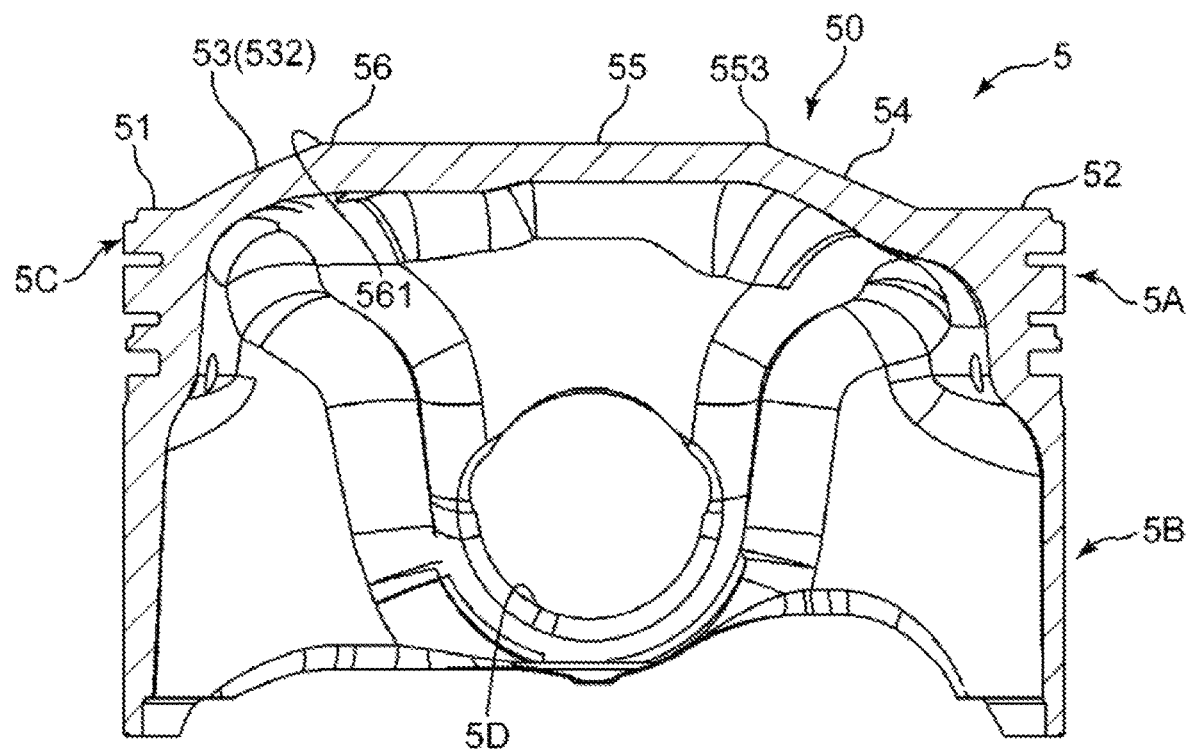
FIG. 7 is a cross-sectional view taken along a line VII-VII of FIG. 5.
Figure 7:
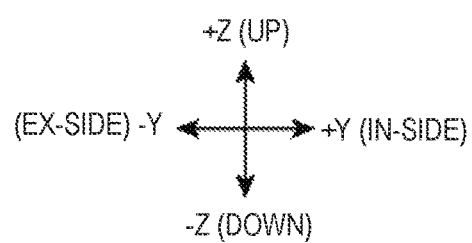

Next, with reference to FIGS. 4 to 7, the structure of the piston 5 (particularly, the structure of the crown surface 50) is described in detail. In this embodiment, a geometrical feature in which the tumble flow Ft described above is maintained up to near a compression top dead center is given to the crown surface 50. FIG. 4 is a perspective view of the piston 5 illustrated in FIGS. 1 and 2, FIG. 5 is a plan view of the crown surface 50 of the piston 5, FIG. 6 is a side view of the crown surface 50, and FIG. 7 is a cross-sectional view taken along a line VII-VII of FIG. 5.

In FIGS. 4 to 7, a directional indication of XYZ is denoted in order to keep the clarity of the explanation. The Z direction corresponds to the cylinder axis AX direction, the X direction corresponds to a front-and-rear direction of the engine body 1 which is an extending direction of the crankshaft 7, and the Y direction corresponds to a direction perpendicular to both the Z direction and the X direction. In each drawing, F-side (+X) and R-side (−X) in the meaning of a front side and a rear side in the installation direction of the engine body 1, respectively, intake side (IN-side; +Y) in the meaning of the side where the intake port 9 is disposed, exhaust side (EX-side; −Y) in the meaning of the side where the exhaust port 10 is disposed, and up (+Z) and down (−Z) in the meaning of up side and down side of the cylinder axis AX are denoted.

The piston 5 includes a piston head 5A and a skirt part 5B provided below (−Z side) the piston head 5A so as to be continuous from the piston head 5A. The piston head 5A is comprised of a cylindrical body, and is provided at an upper surface with the crown surface 50 which constitutes a part of the wall surface (bottom surface) of the combustion chamber 6 and a side circumferential surface 5C which slidably contacts the inner wall surface of the cylinder 2. The side circumferential surface 5C is provided with a plurality of ring grooves into which a piston ring is fitted. The skirt part 5B is disposed on +Y side and −Y side of the piston head 5A to suppress a swinging oscillation of the piston 5 when it reciprocates. A piston boss 5D which defines a pin hole extending in the X direction is formed at the center of the skirt part 5B in the Y direction. A piston pin for coupling to the connecting rod 8 is inserted into the piston boss 5D.

The crown surface 50 is a substantially circular surface which opposes to the combustion chamber ceiling surface 6U in the Z direction. The crown surface 50 includes an exhaust-side bottom part 51, an intake-side bottom part 52, an exhaust-side sloped surface 53, an intake-side sloped surface 54, the flat surface 55, an inter-recess flat surface 56, an F-side side wall 57, and an R-side side wall 58. Among these parts, the exhaust-side bottom part 51 and the intake-side bottom part 52 are base surfaces of which the height in the +Z direction is the lowest among the crown surface 50, and other parts constitute a bulged part which is bulged in the +Z direction from the base surface by the height h.

The exhaust-side bottom part 51 and the intake-side bottom part 52 are flat surfaces which extend in the XY direction perpendicular to the cylinder axis AX, and are located at the same height in the Z direction. Note that the exhaust-side bottom part 51 and the intake-side bottom part 52 may be surfaces with a slight inclination to the XY direction, or surfaces with a slight convex or concave. The exhaust-side bottom part 51 is disposed near an edge of the crown surface 50 on the EX-side (−Y). The intake-side bottom part 52 is disposed near an edge of the crown surface 50 on the IN-side (+Y).

The exhaust-side bottom part 51 is a bow-shaped flat surface in which a −Y-side outer circumferential edge of the crown surface 50 (side circumferential surface 5C) is an arc, and a straight line extending in the X direction is a bowstring. The intake-side bottom part 52 is a bow-shaped flat surface in which a +Y-side outer circumferential edge of the crown surface 50 is an arc, and the straight line extending in the X direction is a bowstring. The exhaust-side bottom part 51 and the intake-side bottom part 52 are squish areas where squish flows are formed when the piston 5 approaches a compression top dead center. In this embodiment, the surface area of the intake-side bottom part 52 is larger than the surface area of the exhaust-side bottom part 51.

The exhaust-side sloped surface 53 is a sloped surface which rises gradually toward the center part in the Y direction of the crown surface 50 (the radial center part of the crown surface 50) from the exhaust-side bottom part 51. A lower end of the exhaust-side sloped surface 53 continues to +Y edge of the exhaust-side bottom part 51, and an upper end continues to −Y edges of the flat surface 55 and the inter-recess flat surface 56. The exhaust-side sloped surface 53 includes a pair of recess parts 531 on +X side and −X side, and an inter-recess part 532 located between the recess parts 531. Each recess part 531 is a substantially semicircular dent for avoiding interference with the exhaust valve 12 disposed in the first or second exhaust port 10A and 10B. The inter-recess part 532 has a substantially trapezoid shape in which, in the plan view in the +Z direction (FIG. 5), a lower edge which continues to the exhaust-side bottom part 51 is a lower bottom, and an upper edge which continues to the inter-recess flat surface 56 located between the pair of recess parts 531 is an upper bottom. Tilt angles to the Y direction of the recess parts 531 and the inter-recess part 532 are set identically. Note that the tilt angles may be slightly different.

The intake-side sloped surface 54 is a sloped surface which rises gradually toward the center part of the crown surface 50 in the Y direction from the intake-side bottom part 52. A lower end of the intake-side sloped surface 54 continues to −Y edge of the intake-side bottom part 52, and an upper end continues to +Y edge of the flat surface 55. In this embodiment, in the plan view in the +Z direction, both the lower end and the upper end of the intake-side sloped surface 54 are edges straightly extending in the X direction. Although the intake-side sloped surface 54 is illustrated as a simple inclined flat surface, a recess part similar to the recess part 531 on the exhaust side may be provided when the interference with the intake valve 11 occurs.

The flat surface 55 is a flat surface which extends in the XY direction perpendicular to the cylinder axis AX in the center part of the crown surface 50 in the Y direction. The flat surface 55 is a flat surface continuously provided between the upper end of the exhaust-side sloped surface 53 and the upper end of the intake-side sloped surface 54. Note that "the continuous flat surface" means a flat surface where no dent, such as a cavity, exists. Further, the flat surface 55 may be a surface with a slight inclination to the XY direction, or a surface with a slight convex or concave, within a range which does not substantially impede the tumble flow Ft.

In more detail, the flat surface 55 has a substantially rectangular shape which is elongated in the X direction in the plan view in the +Z direction. The flat surface 55 has a first EX edge 551 and a second EX edge 552 as side edges on the −Y side, and has an IN edge 553 as a side edge on the +Y side. The first EX edge 551 is coupled to an upper end of the recess part 531 on the +X side. The second EX edge 552 is coupled to an upper end of the recess part 531 on the −X side. The IN edge 553 is coupled to an upper end of the intake-side sloped surface 54. Side edges on the +X side and the −X side of the flat surface 55 each has an arc shape along the circumference of the side circumferential surface 5C.

The inter-recess flat surface 56 is a flat surface disposed between the pair of the recess parts 531 of the exhaust-side sloped surface 53. The inter-recess flat surface 56 is also a flat surface which extends in the XY direction, and is a flat surface which exists in the same plane as the flat surface 55 (i.e., a flat surface located at the same height in the Z direction as the flat surface 55). The inter-recess flat surface 56 is a flat surface which continues to the flat surface 55, that is, the inter-recess flat surface 56 and the flat surface 55 together form a continuous flat surface, the main portion of which is the flat surface 55. The flat surface 55 and the inter-recess flat surface 56 form a top surface of the bulged part in the crown surface 50, and is a surface highest in the +Z direction.

The inter-recess flat surface 56 is formed so as to extend out on the −Y side from the center part in the X direction of the side edge on the −Y side of the flat surface 55 (in other words, extend out on the −Y side from between the first EX edge 551 and the second EX edge 552). An EX edge 561 of the inter-recess flat surface 56 is coupled to an upper end of the inter-recess part 532 of the exhaust-side sloped surface 53. The inter-recess flat surface 56 is located so as to be sandwiched between near the upper ends of the pair of recess parts 531, and has a substantially square shape in the plan view in the +Z direction. Note that only the flat surface 55 may be disposed at the crown surface 50, while omitting the inter-recess flat surface 56 in the crown surface 50.

[Features of Piston Crown Surface]

Figure 8:
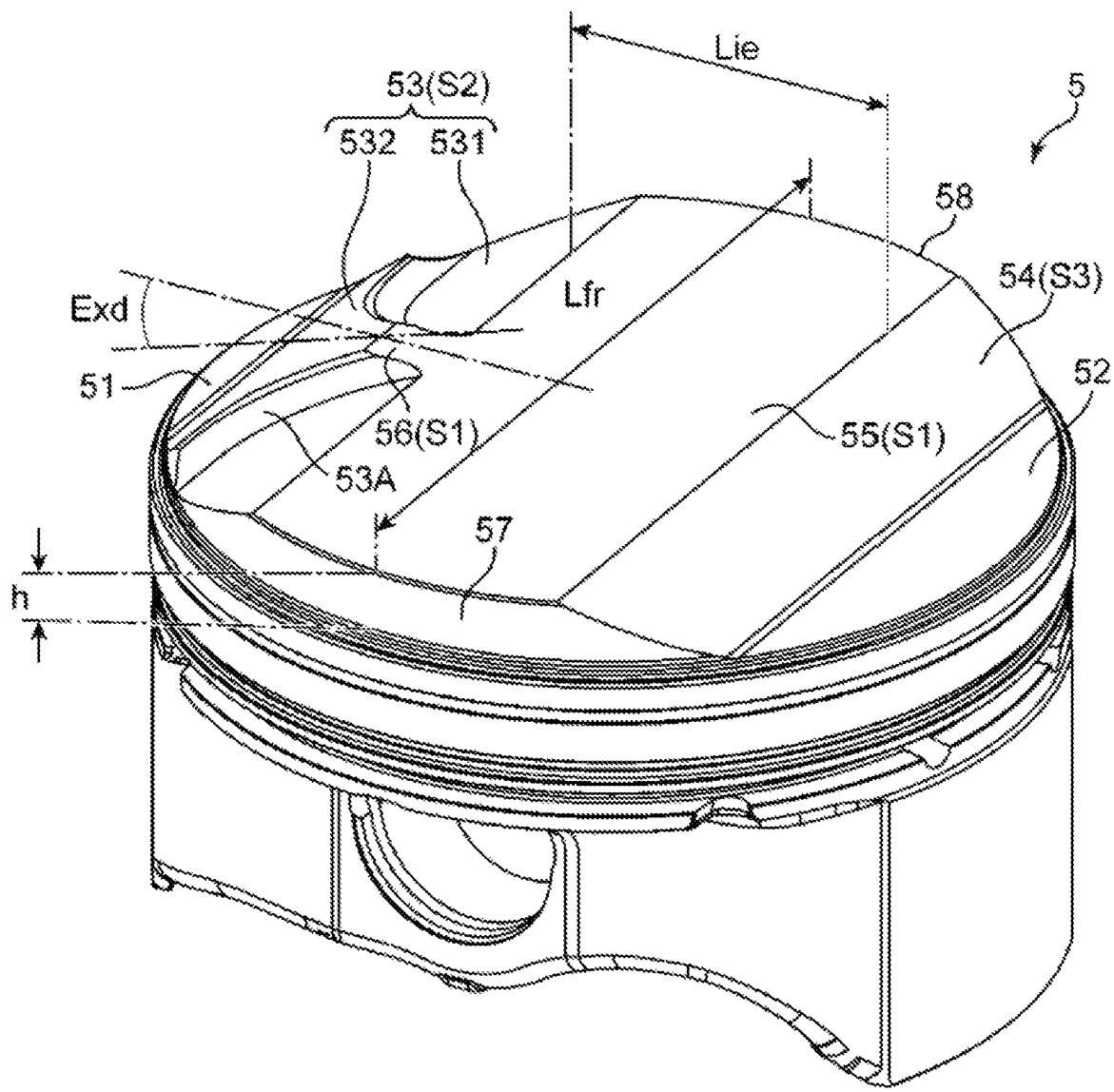
FIG. 8 is a perspective view of the piston where various parameters relevant to the piston crown surface are added.
Figure 8:
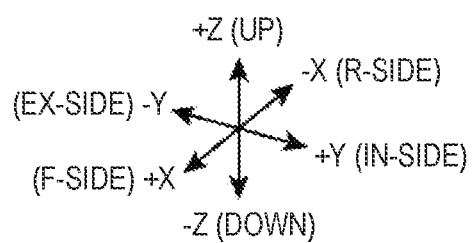

FIG. 8 is a view illustrating various parameters relevant to the crown surface 50 of the piston 5. In the drawing, the height h, a lateral width Lie and a longitudinal width Lfr of the flat surface 55, an exhaust-side sloped surface angle Exd, a surface area S1 of the flat surface 55, a surface area S2 of the exhaust-side sloped surface 53, and a surface area S3 of the intake-side sloped surface 54 are illustrated.

The height h is a height in the Z direction from the exhaust-side bottom part 51 or the intake-side bottom part 52 which is the base surface in the crown surface 50 to the flat surface 55 and the inter-recess flat surface 56 which are the top surfaces. The lateral width Lie is a width of the flat surface 55 in the Y direction (an opposing direction of the exhaust side and the intake side). The longitudinal width Lfr is a width of the flat surface 55 in the X direction. Note that the side edges on the +X side and the −X side of the flat surface 55 are arc edges. The longitudinal width Lfr is a width in the X direction between parts of the arc edges which are most extending out on the +X side or the −X side. The exhaust-side sloped surface angle Exd is a tilt angle of the exhaust-side sloped surface 53 with respect to the Y direction. In this embodiment, since the flat surface 55 is a horizontal surface in the Y direction, the sloped surface angle Exd is an angle between the flat surface 55 and the exhaust-side sloped surface 53.

The surface area S1 of the flat surface 55 is an area of a part surrounded by the side edges on the +X side and the −X side, and the side edges on the +Y side and the −Y side, which defines the flat surface 55, and the surface area S1 can be substantially calculated by a multiplication of the lateral width Lie and the longitudinal width Lfr. Like this embodiment, when the inter-recess flat surface 56 are formed continuously to the flat surface 55, the surface area S1 is treated as a surface area obtained by adding the flat surface 55 and the inter-recess flat surface 56.

The surface area S2 of the exhaust-side sloped surface 53 is an area obtained by adding the surface area of the pair of recess parts 531 and the surface area of the inter-recess part 532. Note that a stepped part 53A which exists between the recess parts 531 and the inter-recess part 532 is not included in the surface area S2. This is because the stepped part 53A does not substantially affect the tumble flow Ft. Although the inter-recess part 532 may be provided with a recess lower part 533 (explicitly illustrated in Example 3, etc. described later) which extends not only between the recess parts 531 but also below the recess parts 531, the surface area S2 in this case also includes the surface area of the recess lower part 533.

In the example of FIG. 8, the surface area S3 of the intake-side sloped surface 54 is an area of an inclined flat surface which simply constitutes the intake-side sloped surface 54. If recess parts which avoid the interference with the intake valves 11 are also formed in the intake-side sloped surface 54, the surface area S3 becomes an area obtained by adding the surface area of the recess parts and the surface area of the inter-recess part.

In this embodiment, in order to reduce the resistance of the tumble flow Ft against the crown surface 50 of the piston 5 and to maintain the tumble flow Ft until the second half of a compression stroke, the surface areas S1, S2, and S3 described above are set to have the following features (1) to (3):

(1) The surface area S1 of the flat surface 55 is larger than the surface area S2 of the exhaust-side sloped surface 53;

(2) The surface area S1 of the flat surface 55 is preferably larger than the surface area S3 of the intake-side sloped surface 54; and (3) The surface area S1 of the flat surface 55 is more preferably larger than the total of the surface area S2 of the exhaust-side sloped surface 53 and the surface area S3 of the intake-side sloped surface 54.

[Meaning of Feature Parts of Crown Surface]

Figure 9A:
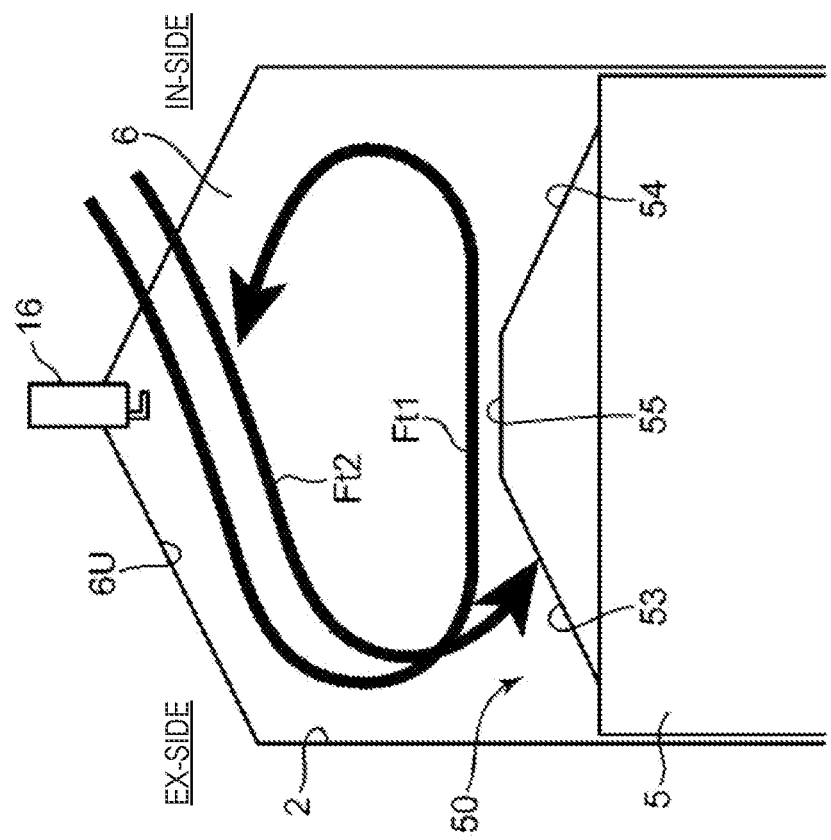
FIG. 9A is a view schematically illustrating a tumble flow in a combustion chamber according to one embodiment of the present disclosure.

Referring to FIGS. 9A to 10B, the meaning of the features (1) to (3) is described. FIG. 9A is a view schematically illustrating the tumble flow Ft when the bottom surface of the combustion chamber 6 is formed by the crown surface 50 of the piston 5 which satisfies the features (1) to (3). Intake air introduced into the combustion chamber 6 from the intake port 9 (tumble port) disposed at the pentroof combustion chamber ceiling surface 6U forms the tumble flow Ft. Since the flat surface 55 which is "the continuous flat surface" is formed in the crown surface 50, the tumble flow Ft can flow along the flat surface 55, without being impeded by a dent, such as a cavity. Further, since the correlation between the surface areas S1 to S3 are set as the features (1) to (3), the tumble flow Ft will not become weaker by the existence of the exhaust-side sloped surface 53 and the intake-side sloped surface 54.

According to the above structure of the crown surface 50, the resistance of the tumble flow Ft against the crown surface 50 is reduced, and the tumble flow Ft becomes easier to continue its flow inside the combustion chamber 6. That is, the opportunity of the tumble flow Ft colliding the exhaust-side sloped surface 53 and the inner wall of the cylinder 2 and disappearing can be reduced, and therefore, the tumble flow Ft can easily be maintained until the second half of a compression stroke. Turbulent energy is generated when the tumble flow Ft collapses. Maintaining the tumble flow Ft leads to that the turbulent energy which is originally held by the tumble flow Ft is maintained at a high state, without any loss by the collision. Therefore, it becomes possible to speed up the combustion speed of the air-fuel mixture inside the combustion chamber 6 by collapsing the tumble flow Ft in the second half of a compression stroke and generating the high turbulent energy.

In the combustion chamber 6, flame propagation combustion of the air-fuel mixture occurs, triggered by the ignition of the spark plug 16. Here, when the cylinder 2 is set as the high compression ratio, the pressure and the temperature inside the combustion chamber 6 increase excessively at the compression end of the piston 5 to induce abnormal combustion. Abnormal combustion is a rapid self-ignition of unburnt fuel gas before the completion of the flame propagation combustion, and causes knocking. However, by maintaining the tumble flow Ft until the second half of a compression stroke and speeding up the combustion speed, the combustion can be completed before the occurrence of the self-ignition which leads to knocking. In addition, since knocking can be suppressed, a control for retarding the combustion center of gravity by performing a control for intentionally suppressing the engine output (for example, a control of the fuel injection timing of the injector 15) can be avoided. Further, as the result, the high compression ratio of the cylinder 2 can be achieved and the fuel efficiency can be improved.

Figure 9B:
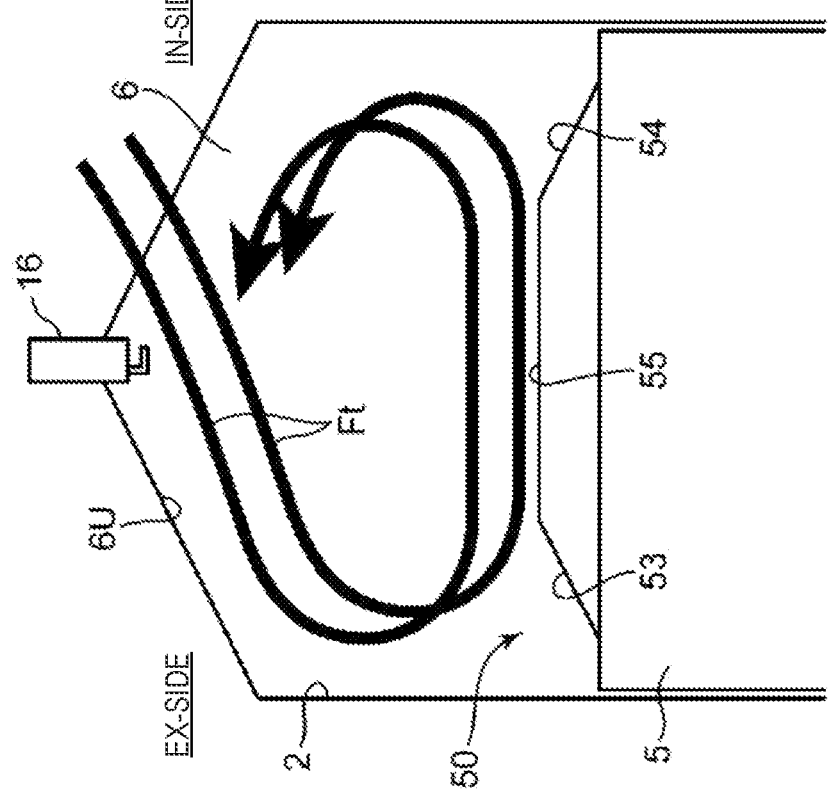
FIG. 9B is a view schematically illustrating a tumble flow in a combustion chamber according to Comparative Example.

Next, a Comparative Example which does not satisfy the features (1) to (3) is described. FIG. 9B is a view schematically illustrating the tumble flow Ft inside the combustion chamber 6, when the crown surface 50 which does not satisfy the feature (1) is adopted. The tumble flow Ft is a flow which enters into the combustion chamber 6 from the IN-side, turns at the inner wall of the cylinder 2 on the EX-side, and goes toward the IN-side along the crown surface 50. When not satisfying the feature (1) (i.e., when the surface area S2 of the exhaust-side sloped surface 53 is larger than the surface area S1 of the flat surface 55), the tumble flow Ft becomes easier to collide with the exhaust-side sloped surface 53, and therefore, the rate of the tumble flow Ft maintained until the second half of a compression stroke is lowered. That is because, as illustrated in FIG. 9B, a part of tumble flow (Ft1) goes toward the IN-side from the EX-side so as to be guided by the flat surface 55, while another part of tumble flow (Ft2) collides with the exhaust-side sloped surface 53 after the turn and then collapses. As described in the feature (1), by setting the surface area S1 of the flat surface 55 larger than the surface area S2 of the exhaust-side sloped surface 53, the tumble flow Ft which collides with the exhaust-side sloped surface 53 and disappears can be reduced.

Figure 10B:
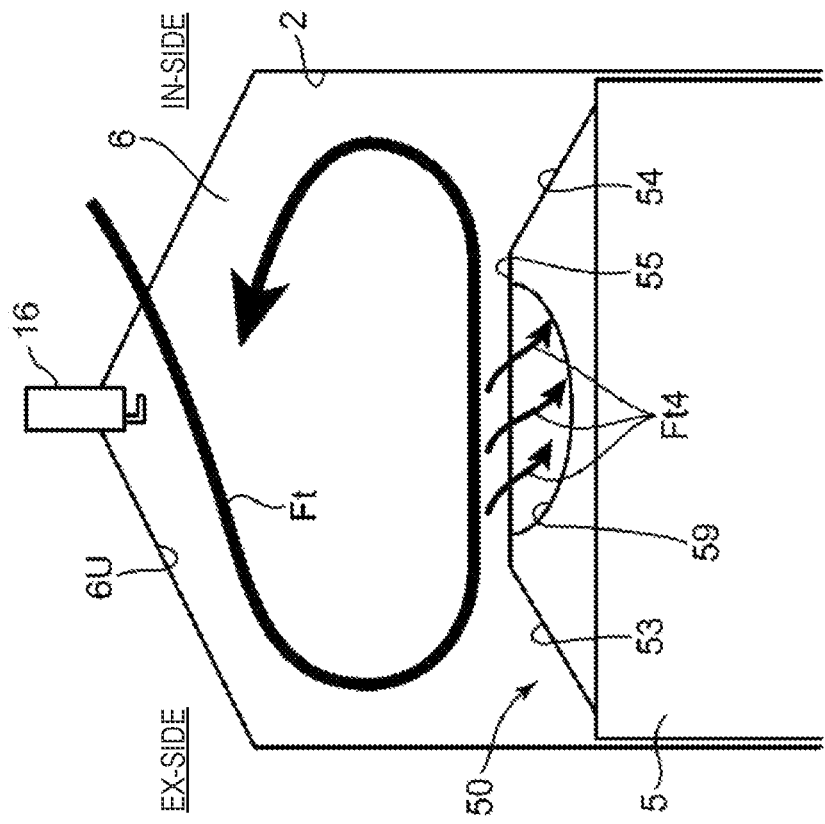
FIGS. 10A and 10B are views schematically illustrating the tumble flow in the combustion chamber according to Comparative Example.
Figure 10A:
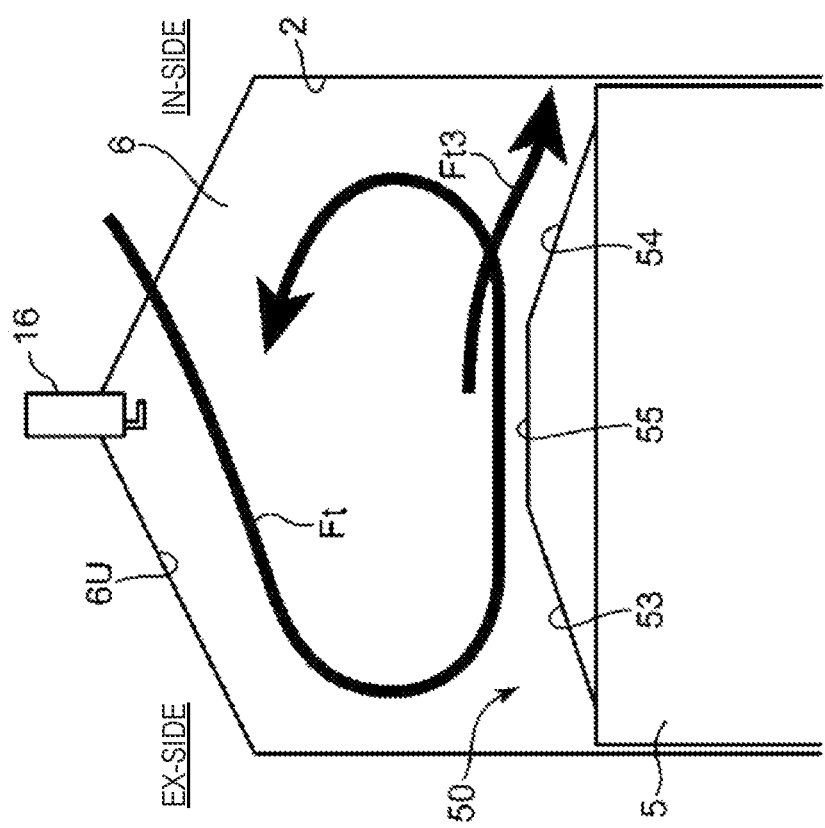

FIG. 10A is a view schematically illustrating a flow of the tumble flow Ft inside the combustion chamber 6, when not satisfying the feature (2). When not satisfying the feature (2) (i.e., when the surface area S3 of the intake-side sloped surface 54 is larger than the surface area S1 of the flat surface 55), a derived flow Ft3 along the intake-side sloped surface 54 becomes easier to be formed. The derived flow Ft3 is a flow deviated from the course of the tumble flow Ft which is the main flow, and it is guided by the intake-side sloped surface 54 and becomes a flow which goes toward the IN-side inner wall surface of the cylinder 2. The derived flow Ft3 collides the inner wall surface of the cylinder 2 and disappears later. Therefore, the derived flow Ft3 becomes loss of the tumble flow Ft, and it reduces the tumble flow Ft which is maintained until the second half of a compression stroke. As described in the feature (2), by setting the surface area S1 of the flat surface 55 larger than the surface area S3 of the intake-side sloped surface 54, the derived flow Ft3 which goes toward the inner wall of the cylinder 2 along the intake-side sloped surface 54 can be suppressed.

By at least satisfying the feature (1), the maintainability of the tumble flow Ft can be improved. In addition, by satisfying the feature (2), the maintainability of the tumble flow Ft may be further improved. Moreover, in addition to satisfying the features (1) and (2), as described in the feature (3), it is desirable to set the surface area S1 of the flat surface 55 larger than the total of the surface area S2 of the exhaust-side sloped surface 53 and the surface area S3 of the intake-side sloped surface 54. Thus, the collision of the tumble flow Ft to the exhaust-side sloped surface 53 as illustrated in FIG. 9B, and the collision of the tumble flow Ft to the IN-side inner wall of the cylinder 2 due to being guided by the intake-side sloped surface 54 as illustrated in FIG. 10A can be further suppressed, and therefore, the maintainability of the tumble flow Ft can be further improved.

FIG. 10B is a view schematically illustrating the tumble flow Ft inside the combustion chamber 6, when the flat surface 55 is not "the continuous flat surface." A typical example of the flat surface 55 being not "the continuous flat surface" is a case where a cavity 59 is formed in the flat surface 55, and FIG. 10B illustrates this case. The cavity 59 is a part of the flat surface 55 where the center area is dented in a bowl shape. In this case, the surface area S1 of the flat surface 55 becomes smaller, and it becomes difficult to satisfy the features (1) to (3). In addition, the tumble flow Ft is impeded by the cavity 59. That is, a part of the tumble flow Ft becomes a derived flow Ft4 which enters into the dent of the cavity 59. The derived flow Ft4 collides with the wall surface of the cavity 59 and disappears. Therefore, the derived flow Ft4 becomes a loss and it reduces the tumble flow Ft which is maintained until the second half of a compression stroke. Thus, there is meaning in the flat surface 55 being "the continuous flat surface."

[Other Features of Combustion Chamber Structure]

Next, the features of the combustion chamber structure other than the surface areas S1 to S3 are described. First, preferably the lateral width Lie which is the Y direction width of the flat surface 55, and the ratio Lie/h of the lateral width Lie to the height h satisfy the following relationship within a range of the compression ratio of 13.5:1 to 15.5:1.

$$2.5 < Lie/h < 9.0 \quad (A)$$

In the combustion chamber 6 provided with the pentroof combustion chamber ceiling surface 6U, the inclination angle of the exhaust-side sloped surface 53 and the intake-side sloped surface 54 of the crown surface 50 becomes an angle substantially according to the inclination angle of the combustion chamber ceiling surface 6U. Thus, the height h significantly influences the lateral width Lie of the flat surface 55. Increasing the height h leads to increasing the compression ratio. For example, if the height h is increased in order to improve the fuel efficiency, the lateral width Lie becomes narrower. That is, the surface area S1 of the flat surface 55 becomes smaller. In this case, even if the fuel efficiency improves, it becomes difficult to maintain the tumble flow Ft until the second half of a compression stroke. After all, the control for suppressing the engine output is required for the prevention of a knock. However, by setting Lie/h within the range of the formula (A) described above, both the improvement in the fuel efficiency and the improvement in the engine output can be achieved. In order to make both the improvements more desirable, preferably Lie/h satisfies the following relationship, within the compression ratio range of 13.5:1 to 15.5:1.

$$5.0 < Lie/h < 9.0 \quad (A1)$$

Next, preferably the longitudinal width Lfr which is the X direction width of the flat surface 55 and the ratio Lfr/h of the longitudinal width Lfr to the height h satisfy the following relationship, within the compression ratio range of 13.5:1 to 15.5:1.

$$12.0 < Lfr/h < 16.0 \quad (B)$$

Similarly to the lateral width Lie, as the height h increases, the longitudinal width Lfr becomes narrower and the surface area S1 of the flat surface 55 becomes smaller. Therefore, it becomes difficult to maintain the tumble flow Ft until the second half of a compression stroke, and the suppression of the engine output is required. However, by setting Lfr/h within the range of the formula (B) described above, both the improvement in the fuel efficiency and the improvement in the engine output can be achieved. In order to make both the improvements more desirable, preferably Lfr/h satisfies the following relationship, within the compression ratio range of 13.5:1 to 15.5:1.

$$13.5 < Lfr/h < 14.5 \quad (B1)$$

Here, the longitudinal width Lfr of the flat surface 55 is desirably larger than the lateral width Lie. As schematically illustrated in FIG. 2, the tumble flow Ft is introduced into the combustion chamber 6 from the intake port 9, turns back at the EX-side inner wall of the cylinder 2, and goes toward the IN-side through above the flat surface 55. If the flat surface 55 has the longitudinal width Lfr smaller than the lateral width Lie, no flat surface exists at the end of the crown surface 50 on the +X side and the −X side. In this case, it becomes difficult for the tumble flow Ft to be guided at the ends on the +X side and the −X side, and therefore, the flow loss occurs. On the other hand, by using the flat surface 55 of which the longitudinal width Lfr is larger than the lateral width Lie, the tumble flow Ft can now be guided also at the ends on the +X side and the −X side to improve the maintainability of the tumble flow Ft.

(Exd×S1)/h indicative of the relationship between the exhaust-side sloped surface angle Exd which is the angle between the flat surface 55 and the exhaust-side sloped surface 53, the surface area S1 of the flat surface 55, and the height h preferably satisfies the following relationship, within the compression ratio range of 13.5:1 to 15.5:1.

$$5{,}000 < (Exd \times S1)/h < 18{,}000 \quad (C)$$

Since the tumble flow Ft acts as described above, the tumble flow Ft being changed at the boundary part between the exhaust-side sloped surface 53 and the flat surface 55 or colliding the exhaust-side sloped surface 53 can be suppressed more as the exhaust-side sloped surface angle Exd decreases. However, unless the height h is set at a certain height, the compression ratio cannot be increased. In order to increase the height h and to increase the surface area S1 of the flat surface 55, it is necessary to increase the exhaust-side sloped surface angle Exd. In order to achieve both the high compression ratio and the high maintainability of the tumble flow Ft in consideration of the contradictory request, (Exd×S1)/h may be set within the range of the formula (C).

In order to make both the improvements more desirable, preferably (Exd×S1)/h satisfies the following relationship, within the compression ratio range of 13.5:1 to 15.5:1.

$$7,000 < (Exd \times S1)/h < 12,000 \qquad (C1)$$

Next, in the combustion chamber 6 defined by the crown surface 50 having the flat surface 55, the geometrical feature which can form equivalent in-cylinder flow inside the combustion chamber 6, even if the displacement of the engine body 1 varies, is illustrated. As illustrated in FIG. 3, the swirl flow Fs which is a lateral vortex as the in-cylinder flow inside the combustion chamber 6 can be formed by the swirl valve 17 regulating the flow of the intake air in the second intake port 9B. In this embodiment, the swirl flow Fs becomes the oblique swirl flow which is the mixture with the tumble flow Ft.

When the displacement of the engine body 1 is changed, the bore diameter Lb and the stroke Ls are also changed (FIG. 2). The bore diameter Lb is an inner diameter of the cylinder 2 and is a length substantially equivalent to the diameter of the piston 5. The stroke Ls is a length for which the piston 5 moves in the Z direction between TDC (top dead center) and BDC (bottom dead center). When the engine displacement is changed, the swirl flow Fs is changed, even if the engine speed and load are the same. Thus, for example, during a combustion simulation, it is necessary to perform a calibration according to the swirl flow Fs for every displacement, and this becomes a bottleneck in engine development.

The swirl flow Fs is greatly influenced by a relationship between the height h and the stroke Ls of the piston 5. In terms of achieving the equivalent flow of the swirl flow Fs and the equivalent combustion inside the combustion chamber 6 with the same engine speed and load even if the engine displacement differs, preferably h/Ls which is the ratio of the height h to the stroke Ls satisfies the following relationship, within the compression ratio range of 13.5:1 to 15.5:1.

$$0.045 < h/Ls < 0.065 \qquad (D)$$

When the height h is high and the stroke Ls is small, the swirl flow Fs becomes easier to collide with the bulged parts of the crown surface 50 of the piston 5 (the exhaust-side sloped surface 53, the intake-side sloped surface 54, and the flat surface 55), and therefore, the swirl flow Fs is attenuated. On the other hand, when the height h is low and the stroke Ls is large, the distance for which the swirl flow Fs contacts the inner wall surface of the cylinder 2 becomes longer, and it also becomes the factor for attenuating the swirl flow Fs. However, by setting h/Ls within the range of the formula (D) described above, the attenuation of the swirl flow Fs resulting from the height h being high can be equivalent to the attenuation of the swirl flow Fs resulting from the stroke Ls being large. Therefore, even when the engine displacement differs, the equivalent swirl flow Fs can be formed inside the combustion chamber 6 to achieve the equivalent combustion inside the combustion chamber 6.

Further, the swirl flow Fs is also greatly influenced by the relationship between the height h and the bore diameter Lb. In terms of achieving the equivalent swirl flow Fs and the equivalent combustion inside the combustion chamber 6 with the same engine speed and load even if the engine displacement differs, preferably h/Lb which is the ratio of the height h to the bore diameter Lb satisfies the following relationship, within the compression ratio range of 13.5:1 to 15.5:1.

$$0.055 < h/Lb < 0.075 \qquad (E)$$

When the height h is high and the bore diameter Lb is small, the swirl flow Fs becomes easier to collide with the bulged parts of the crown surface 50 of the piston 5, and therefore, the swirl flow Fs is attenuated. On the other hand, when the height h is low and the bore diameter Lb is large, the distance for which the swirl flow Fs contacts the inner wall surface of the cylinder 2 becomes longer, and therefore, this also becomes the factor for attenuating the swirl flow Fs. However, by setting h/Lb within the range of the formula (E) described above, the attenuation of the swirl flow Fs resulting from the height h being high can be equivalent to the attenuation of the swirl flow Fs resulting from the bore diameter Lb being large. Therefore, even when the engine displacement differs, the equivalent swirl flow Fs can be formed inside the combustion chamber 6 to achieve the equivalent combustion inside the combustion chamber 6.

[Examples and Comparative Example of Crown Surface Design]

FIGS. 11 to 14 are tables illustrating structures and parameters of the crown surface 50 of the piston 5 according to Examples 1 to 7 of the present disclosure and Comparative Example. Here, the piston 5 applied to engines having different displacements are illustrated. The piston 5 of Examples 1-5 and Comparative Example has a displacement of 1.5 liters, Example 6 has a displacement of 2.0 liters, and Example 7 has a displacement of 2.5 liters.

An outline perspective view and a plan view of the crown surface 50 are illustrated for each example of FIGS. 11 to 14. Further, the positions and the surface areas of the flat surface 55, the intake-side sloped surface 54, and the exhaust-side sloped surface 53 are illustrated. As for the exhaust-side sloped surface 53, a surface area of each part (surface areas of the recess part 531 and the inter-recess part 532, and a surface area of the recess lower part 533, if applicable) is also described. Further, the total value of the surface area of the intake-side sloped surface 54 and the surface area of the exhaust-side sloped surface 53 is illustrated as a "total of the sloped surface areas."

For each example, a turbulent energy ratio (turbulent flow E ratio) based on an analysis value of turbulent energy is illustrated. The analysis value of the turbulent energy is derived by an analysis operation using dedicated software ("CONVERGE" created by IDAJ Co., LTD), as the turbulent energy of the in-cylinder flow (tumble flow Ft) when the piston 5 is located at a compression top dead center. The turbulent flow E ratio is a ratio of the analysis value of the turbulent energy of each of Examples 1 to 7, when the analysis value of the turbulent energy obtained for "Comparative Example" of FIG. 14 is set as "1." Moreover, the compression ratio for each example is also illustrated.

The flat surface 55 where the inter-recess flat surface 56 is not provided is illustrated in Examples 1 and 2, and the flat surface 55 where the inter-recess flat surface 56 is provided is illustrated in Examples 3 to 7. Any of the flat surfaces 55 of Examples 1 to 7 is an example of a "continuous flat surface," and the cavity is not formed. On the other hand, Comparative Example has the cavity 59 in the radial center area of the crown surface 50.

Example 1 is an example where the surface area of the flat surface 55 is larger than the surface area of the exhaust-side sloped surface 53. Example 2 is an example where the surface area of the flat surface 55 is larger than each of the surface area of the exhaust-side sloped surface 53 and the surface area of the intake-side sloped surface 54. Examples 3-7 are examples where the surface area of the flat surface 55 is larger than each of the surface area of the exhaust-side sloped surface 53 and the surface area of the intake-side sloped surface 54 and is larger than the "total of sloped surface areas." In Examples 3-7, the surface area of the flat surface 55 is about 2.5 to 5 times of the surface area of the exhaust-side sloped surface 53 and about 2.5 to 4.1 times of the surface area of the intake-side sloped surface 54, and about 1.3 to 2.2 times of the "total of sloped surface areas." Comparative Example is an example where the surface area of the flat surface 55 is smaller than any of the surface area of the exhaust-side sloped surface 53 and the surface area of the intake-side sloped surface 54.

It is found that the turbulent flow E ratio of any of Examples 1 to 7 is larger than the turbulent flow E ratio of Comparative Example. Particularly, the turbulent flow E ratios of Examples 3-7 are more than 50% higher than the turbulent flow E ratio of Comparative Example. From these results, in Examples 1 to 7, the maintainability of the tumble flow Ft is increased, and most of the tumble flow Ft was successfully collapsed in the second half of a compression stroke. Therefore, according to Examples 1 to 7, the high turbulent energy can be generated in the second half of the compression stroke to speed up the combustion speed.

[Operation and Effects]

According to the combustion chamber structure for the engine according to the embodiment described above, it provides the following functions and effects. First, since the continuous flat surface 55 is formed in the crown surface 50, the tumble flow Ft can flow along the flat surface 55, without being impeded by the dent, such as a cavity. Further, since the surface area S1 of the flat surface 55 is set larger than the surface area S2 of the exhaust-side sloped surface 53, it can be suppressed that the tumble flow Ft collides the exhaust-side sloped surface 53 and becomes weaker. Therefore, by collapsing the tumble flow Ft after maintaining it until the second half of a compression stroke to generate the high turbulent energy, it becomes possible to speed up the combustion speed. Therefore, the combustion of the air-fuel mixture inside the combustion chamber 6 can be completed, before the occurrence of a self-ignition which results in a knock. In addition, since a knock can be suppressed, the control for suppressing the engine output, such as retarding the combustion center of gravity, can be avoided. As the result, the high compression ratio can be achieved.

If the surface area S1 of the flat surface 55 can be set larger than the surface area S3 of the intake-side sloped surface 54, the tumble flow Ft along the intake-side sloped surface 54 will be difficult to be formed. Therefore, the collision of the tumble flow Ft to the inner wall surface of the cylinder 2 can be prevented, and the maintainability of the tumble flow Ft can be improved. Therefore, it becomes easier to maintain the tumble flow Ft until the second half of a compression stroke. Further, if the surface area S1 of the flat surface 55 is set larger than the total of the surface area S2 of the exhaust-side sloped surface 53 and the surface area S3 of the intake-side sloped surface 54, the collision of the tumble flow Ft to the exhaust-side sloped surface 53, and the collision of the tumble flow Ft to the inner wall surface of the cylinder 2 by being guided by the intake-side sloped surface 54 can be further suppressed. Therefore, the maintainability of the tumble flow Ft can be further improved.

Further, the spark plug 16 which achieves the flame propagation combustion is disposed in the combustion chamber ceiling surface 6U which opposes to the flat surface 55 of the crown surface 50. In this embodiment, it is disposed at the center of the combustion chamber 6 (on the cylinder axis AX). Intake air compressed without the tumble flow Ft being weakened, becomes high in the turbulent energy at the position opposing to the flat surface 55. By disposing the spark plug 16 at such a position, the combustion speed of the flame propagation combustion can be sped up.

Further, the injector 15 is disposed on the intake side of the combustion chamber 6. Therefore, it becomes easier to put the fuel sprayed from the injector 15 on the tumble flow Ft so that the homogeneous air-fuel mixture is formed inside the combustion chamber 6.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
11 Intake Valve
12 Exhaust Valve
15 Injector
16 Spark Plug
2 Cylinder
5 Piston
50 Crown Surface
51 Exhaust-side Bottom Part
52 Intake-side Bottom Part
53 Exhaust-side Sloped Surface
54 Intake-side Sloped Surface
55 Flat Surface
56 Inter-recess Flat Surface
6 Combustion Chamber
6U Combustion Chamber Ceiling Surface (Pentroof Ceiling Surface)
9 Intake Port
10 Exhaust Port
AX Cylinder Axis
Fs Swirl Flow
Ft Tumble Flow
Surface Area of Flat Surface
S2 Surface Area of Exhaust-side Sloped Surface
S3 Surface Area of Intake-side Sloped Surface

What is claimed is:

1. An engine comprising:
a combustion chamber defined by a crown surface of a piston, an inner wall surface of a cylinder in which the piston is slidably accommodated, and a pentroof ceiling surface formed in a cylinder head, wherein
an opening of an intake port configured to supply intake air to the combustion chamber and an opening of an exhaust port configured to discharge exhaust gas from the combustion chamber are formed in the ceiling surface, a side on which the intake port is disposed is an intake side, and a side on which the exhaust port is disposed is an exhaust side,
the crown surface includes:

an exhaust-side bottom part disposed near an exhaust-side edge of the crown surface, and an intake-side bottom part disposed near an intake-side edge of the crown surface;

an exhaust-side sloped surface rising toward a center part of the crown surface from the exhaust-side bottom part;

an intake-side sloped surface rising toward the center part of the crown surface from the intake-side bottom part; and a flat surface provided continuously between an upper end of the exhaust-side sloped surface and an upper end of the intake-side sloped surface, and extending in a direction perpendicular to an axial direction of the cylinder in the center part of the crown surface, a surface area of the flat surface is larger than a surface area of the exhaust-side sloped surface, the flat surface includes an inter-recess flat surface disposed between a pair of recess parts of the exhaust-side sloped surface, and that continues to a main portion of the flat surface, and no cavity is formed in the flat surface.

2. The engine of claim 1, wherein the surface area of the flat surface is larger than a surface area of the intake-side sloped surface.

3. The engine of claim 2, wherein a geometric compression ratio of the cylinder is set within a range of 13.5:1 or higher and 15.5:1 or lower.

4. The engine of claim 2, wherein an injector configured to inject fuel into the combustion chamber is disposed on the intake side of the combustion chamber.

5. The engine of claim 2, wherein a spark plug configured to achieve flame propagation combustion inside the combustion chamber is disposed in the ceiling surface opposing to the flat surface.

6. The engine of claim 2, wherein the surface area of the flat surface is larger than a total of the surface area of the exhaust-side sloped surface and the surface area of the intake-side sloped surface.

7. The engine of claim 6, wherein a geometric compression ratio of the cylinder is set within a range of 13.5:1 or higher and 15.5:1 or lower.

8. The engine of claim 6, wherein an injector configured to inject fuel into the combustion chamber is disposed on the intake side of the combustion chamber.

9. The engine of claim 6, wherein a spark plug configured to achieve flame propagation combustion inside the combustion chamber is disposed in the ceiling surface opposing to the flat surface.

10. The engine of claim 9, wherein a geometric compression ratio of the cylinder is set within a range of 13.5:1 or higher and 15.5:1 or lower.

11. The engine of claim 9, wherein an injector configured to inject fuel into the combustion chamber is disposed on the intake side of the combustion chamber.

12. The engine of claim 11, wherein a geometric compression ratio of the cylinder is set within a range of 13.5:1 or higher and 15.5:1 or lower.

13. The engine of claim 1, wherein a spark plug configured to achieve flame propagation combustion inside the combustion chamber is disposed in the ceiling surface opposing to the flat surface.

14. The engine of claim 1, wherein an injector configured to inject fuel into the combustion chamber is disposed on the intake side of the combustion chamber.

15. The engine of claim 1, wherein a geometric compression ratio of the cylinder is set within a range of 13.5:1 or higher and 15.5:1 or lower.

16. The engine of claim 1, wherein the flat surface is substantially rectangular.

17. An engine comprising:
a combustion chamber defined by a crown surface of a piston, an inner wall surface of a cylinder in which the piston is slidably accommodated, and a pentroof ceiling surface formed in a cylinder head, wherein an opening of an intake port configured to supply intake air to the combustion chamber and an opening of an exhaust port configured to discharge exhaust gas from the combustion chamber are formed in the ceiling surface, a side on which the intake port is disposed is an intake side, and a side on which the exhaust port is disposed is an exhaust side, the crown surface includes:
an exhaust-side bottom part disposed near an exhaust-side edge of the crown surface, and an intake-side bottom part disposed near an intake-side edge of the crown surface;

an exhaust-side sloped surface rising toward a center part of the crown surface from the exhaust-side bottom part;

an intake-side sloped surface rising toward the center part of the crown surface from the intake-side bottom part; and a flat surface provided continuously between an upper end of the exhaust-side sloped surface and an upper end of the intake-side sloped surface, and extending in a direction perpendicular to an axial direction of the cylinder in the center part of the crown surface, a surface area of the flat surface is larger than a surface area of the exhaust-side sloped surface, the flat surface is substantially rectangular, and
no cavity is formed in the flat surface.

18. An engine comprising:
a combustion chamber defined by a crown surface of a piston, an inner wall surface of a cylinder in which the piston is slidably accommodated, and a pentroof ceiling surface formed in a cylinder head, wherein an opening of an intake port configured to supply intake air to the combustion chamber and an opening of an exhaust port configured to discharge exhaust gas from the combustion chamber are formed in the ceiling surface, a side on which the intake port is disposed is an intake side, and a side on which the exhaust port is disposed is an exhaust side, the crown surface includes:
an exhaust-side bottom part disposed near an exhaust-side edge of the crown surface, and an intake-side bottom part disposed near an intake-side edge of the crown surface;

an exhaust-side sloped surface rising toward a center part of the crown surface from the exhaust-side bottom part;

an intake-side sloped surface rising toward the center part of the crown surface from the intake-side bottom part; and a flat surface provided continuously between an upper end of the exhaust-side sloped surface and an upper end of the intake-side sloped surface, and extending in a direction perpendicular to an axial direction of the cylinder in the center part of the crown surface, a surface area of the flat surface is larger than a surface area of the exhaust-side sloped surface, the surface area of the flat surface is larger than a surface area of the intake-side sloped surface, and no cavity is formed in the flat surface.

\* \* \* \* \*